(12) United States Patent
Watanabe et al.

(10) Patent No.: US 11,965,346 B2
(45) Date of Patent: Apr. 23, 2024

(54) BOOTH

(71) Applicant: FUJIFILM BUSINESS INNOVATION CORP., Tokyo (JP)

(72) Inventors: Shu Watanabe, Kanagawa (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 379 days.

(21) Appl. No.: 17/374,001

(22) Filed: Jul. 13, 2021

(65) Prior Publication Data

US 2022/0268042 A1 Aug. 25, 2022

(30) Foreign Application Priority Data

Feb. 22, 2021 (JP) ................. 2021-025786

(51) Int. Cl.
| | | |
|---|---|---|
| *E04H 1/12* | (2006.01) | |
| *A47B 3/02* | (2006.01) | |
| *G06Q 10/02* | (2012.01) | |

(52) U.S. Cl.
CPC ............... *E04H 1/125* (2013.01); *A47B 3/02* (2013.01); *G06Q 10/02* (2013.01)

(58) Field of Classification Search
CPC ..... E04H 1/12; E04H 1/125; A47B 2083/005; A47B 83/001; A47B 83/023; A47B 2200/0071; A47B 2200/0066; A47B 2200/0035; A47B 87/007; A47B 2003/0835

See application file for complete search history.

(56) References Cited

U.S. PATENT DOCUMENTS

| | | | | |
|---|---|---|---|---|
| 1,329,731 | A * | 2/1920 | Veasey .................. | E04H 1/1255 52/239 |
| 3,748,010 | A * | 7/1973 | Garte .................... | A47B 77/10 D6/664 |
| 5,775,034 | A * | 7/1998 | Logue ................... | A47B 21/06 108/37 |
| 8,713,857 | B2 * | 5/2014 | Logue ................... | E04B 2/827 312/246 |
| 2002/0024274 | A1* | 2/2002 | Swaab .................. | E04B 2/7416 312/201 |
| 2014/0318423 | A1* | 10/2014 | Parshad ............... | A47B 87/002 108/60 |
| 2016/0331125 | A1* | 11/2016 | Banks ................... | A47B 1/10 |
| 2020/0018060 | A1* | 1/2020 | Watanabe ............. | E04B 1/388 |
| 2020/0347626 | A1* | 11/2020 | Petty .................... | E04H 1/1255 |
| 2022/0218102 | A1* | 7/2022 | Isgar .................... | A47C 31/007 |

FOREIGN PATENT DOCUMENTS

| | | | | |
|---|---|---|---|---|
| EP | 2769648 A1 | * | 8/2014 | .......... A47F 5/0846 |
| GB | 2501538 A | * | 10/2013 | .......... A47B 83/001 |
| JP | 2001-104054 A | | 4/2001 | |
| JP | 2003-074138 A | | 3/2003 | |
| JP | 2004-150255 A | | 5/2004 | |

* cited by examiner

*Primary Examiner* — Christine T Cajilig
(74) *Attorney, Agent, or Firm* — Oliff PLC (57) ABSTRACT

A booth is made usable by making a reservation, and has an opening that allows a user to enter and exit, in which a top plate of a desk is installed in a space surrounded by a floor and a side wall. A development area or a development position of the top plate is changeable in the space.

19 Claims, 13 Drawing Sheets

BOOTH

CROSS-REFERENCE TO RELATED APPLICATIONS

This application is based on and claims priority under 35 USC 119 from Japanese Patent Application No. 2021-025786 filed Feb. 22, 2021.

BACKGROUND (i) Technical Field

The present disclosure relates to a booth.

(ii) Related Art

There is known a private room box composed of a ceiling panel, a floor panel, and front, rear, right and left wall panels on four sides, in which the panels are each made of a lightweight panel and are connected to each other by bolts and nuts to be freely assembled and disassembled, and at least a table portion and a chair for a single person and corresponding to the table portion are provided in the box (Japanese Unexamined Patent Application Publication No. 2004-150255).

There is also known a partition device including a body in which three rectangular panels are connected into the shape of a channel steel with a widened opening end and a door body in which at least two rectangular panels are coupled to each other in a freely foldable manner with one end side on one side of the door body turnably coupled to an opening end side on one side of the body (Japanese Unexamined Patent Application Publication No. 2003-74138).

SUMMARY

Aspects of non-limiting embodiments of the present disclosure relate to providing a booth with a changeable internal layout.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a booth that is made usable by making a reservation and that has an opening that allows a user to enter and exit, in which a top plate of a desk is installed in a space surrounded by a floor and a side wall, in which a development area or a development position of the top plate is changeable in the space.

BRIEF DESCRIPTION OF THE DRAWINGS

An exemplary embodiment of the present disclosure will be described in detail based on the following figures, wherein.

DETAILED DESCRIPTION

An exemplary embodiment and a specific example of the present disclosure will be described in detail below with reference to the drawings. The present disclosure is not limited to the following exemplary embodiment and specific example.

It should be noted that, in the following description of the drawings, the drawings are schematic and the ratio of dimensions etc. may be different from the actual value, and that members other than those required to describe the present disclosure may not be illustrated as appropriate for ease of understanding.

(1) Overall Configuration of Booth

Figure 1:
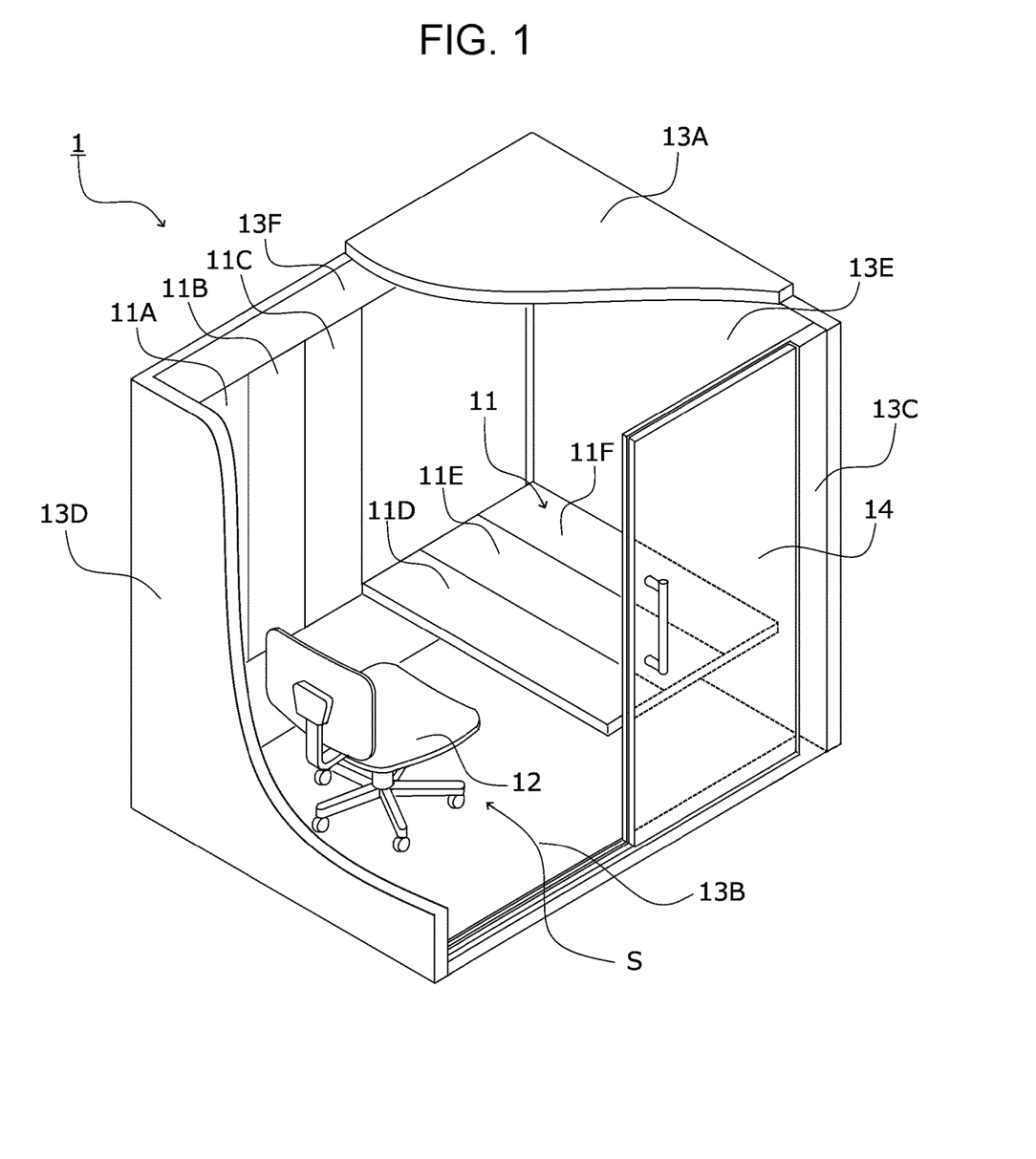
FIG. 1 is a perspective view illustrating the internal configuration of a booth according to the present exemplary embodiment.
Figure 2A:
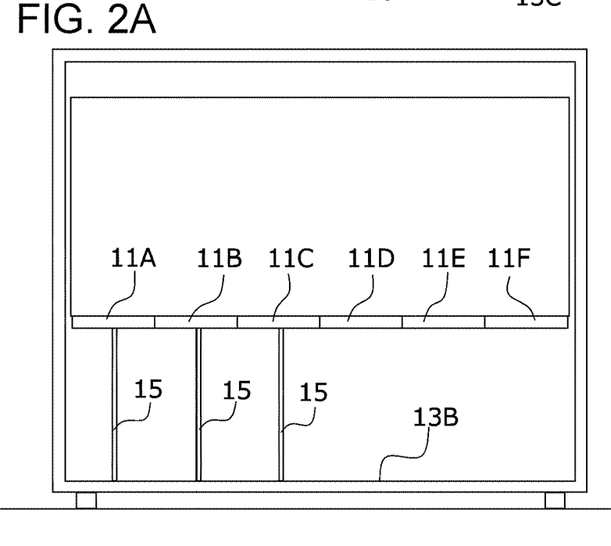
FIG. 2A is a front view illustrating the arrangement of top plates of a desk in the booth.
Figure 2B:
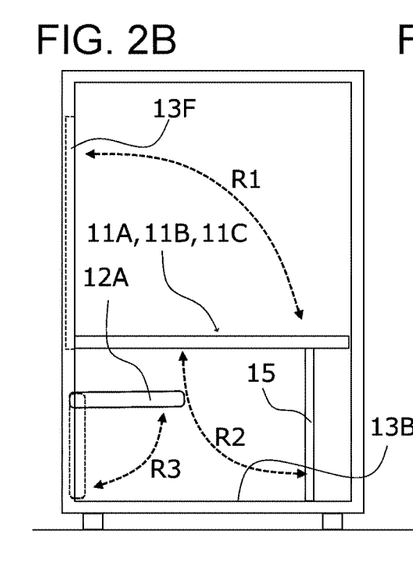
FIGS. 2B and 2C are each a side view illustrating the same.
Figure 2C:
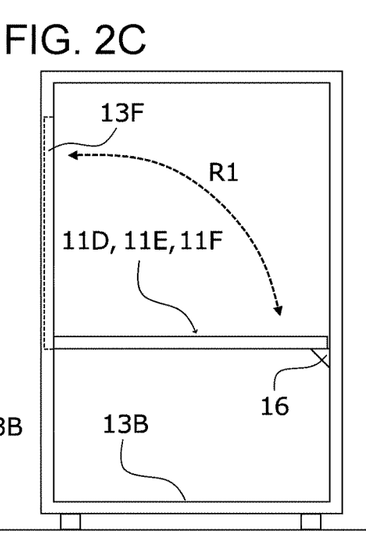
Figure 2D:
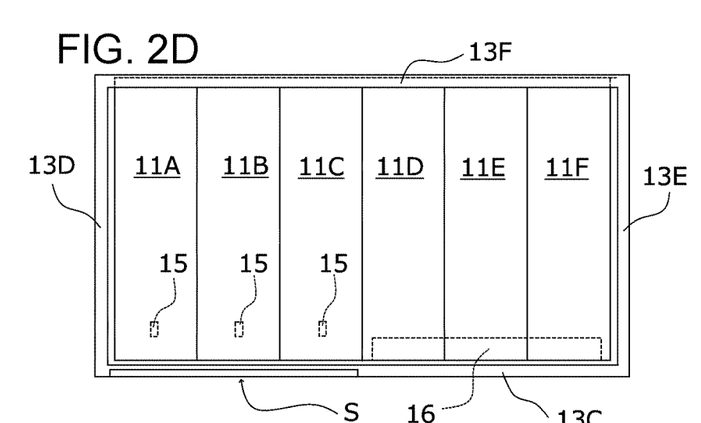
FIG. 2D is a plan view illustrating the same.

FIG. 1 is a perspective view illustrating the internal configuration of a booth 1 according to the present exemplary embodiment. FIG. 2A is a front view illustrating the arrangement of top plates of a desk in the booth 1. FIGS. 2B and 2C are each a side view illustrating the same. FIG. 2D is a plan view illustrating the same. An overall configuration of the booth 1 will be described below with reference to the drawings.

The booth 1 has a box shape as a whole, and includes a desk 11 and a chair 12 provided therein. A user is seated on the chair 12 in a space formed in the booth 1 to work, study, have a meeting, etc. on the desk 11 with a changeable layout.

A framework 13 of the booth 1 is composed of a ceiling 13A, a floor surface 13B, a front wall surface 13C provided with a door 14 that opens and closes an opening S that allows the user to enter and exit, a left wall surface 13D and a right side surface 13E positioned on both sides of the front wall surface 13C, and a back wall surface 13F positioned on the side facing the door 14.

In the present exemplary embodiment, the door 14 is a sliding door. The door 14 is provided with electronic locking (not illustrated) that may be unlocked using an electronic key, in order to provide a service such as a rental service.

In the booth 1, the top plate of the desk 11 (hereinafter simply referred to as a "top plate 11") is divided into a plurality of pieces so that the development area or the development position is changeable. Specifically, the top plate 11 is divided into a plurality of pieces to be stored on the inner surface side of the back wall surface 13F, and the plates are developed in the space as necessary to be usable as the desk 11 (see the arrows R1 in FIGS. 2B and 2C). In the present exemplary embodiment, as illustrated in FIG. 2, the top plate 11 is composed of six pieces, namely top plates 11A, 11B, 11C, 11D, 11E, and 11F. However, the number of top plates is not limited thereto, and may be changed in accordance with the size of the framework 13 of the booth 1.

As illustrated in FIG. 2B, the top plates 11A, 11B, and 11C, which are in a region facing the opening S, of the top plate 11 are supported on the floor surface 13B by legs 15, which are movable between an upright position and a folded position (see the arrow R2 in FIG. 2B). The legs 15 may be rotatably provided on the back surface side of the top plates 11A, 11B, and 11C, or may be provided on the floor surface 13B in a foldable manner.

As illustrated in FIG. 2C, the top plates 11D, 11E, and 11F, which are in a region not facing the opening S, of the top plate 11 are supported by a support portion 16 formed so as to project on the inner surface side of the front wall surface 13C.

The chair 12 may be an ordinary office chair as illustrated in FIG. 1. As illustrated in FIG. 2B, however, the chair 12 may be provided as a seat surface 12A that is foldable on the inner surface side of the back wall surface 13F, for example, and rotated (see the arrow R3 in FIG. 2B) and developed to allow the user to be seated thereon during use. Such a seat surface 12A to be rotated and developed to allow the user to be seated thereon may also be disposed on the inner surface side of the left wall surface 13D and the right side surface 13E as necessary, rather than the inner surface side of the back wall surface 13F.

Modification 1

Figure 3A:
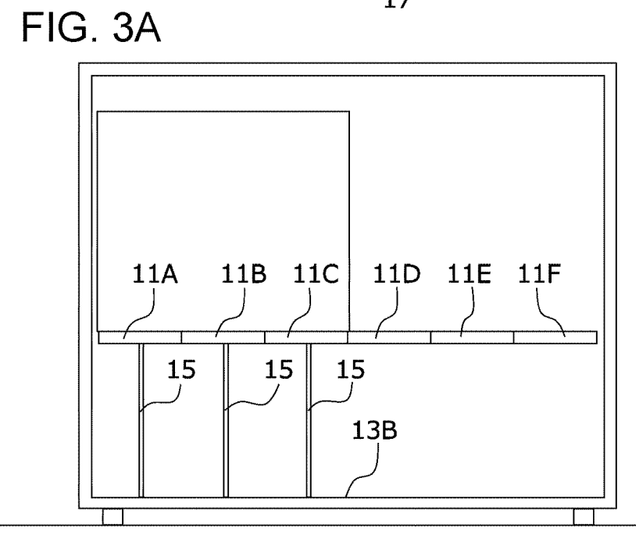
FIG. 3A is a front view illustrating the arrangement of top plates of a desk in the booth according to a first modification.
Figure 3B:
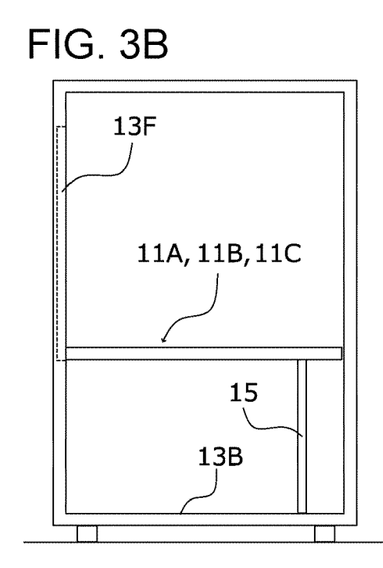
FIGS. 3B and 3C are each a side view illustrating the same.
Figure 3C:
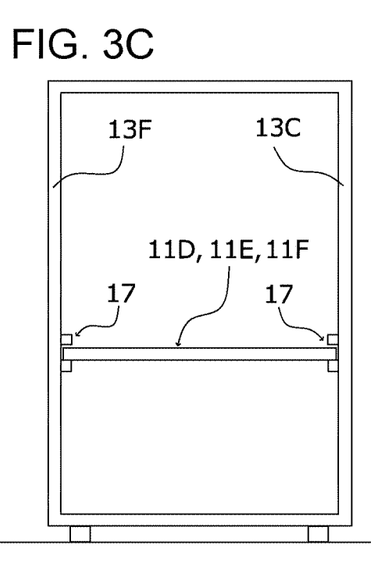
Figure 3D:
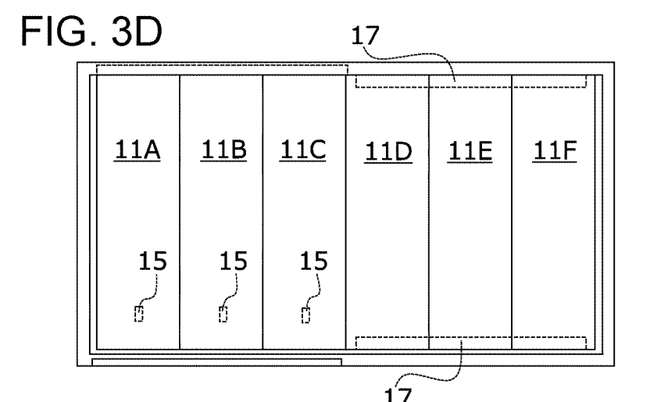
FIG. 3D is a plan view illustrating the same.

FIG. 3A is a front view illustrating the arrangement of top plates of a desk in the booth 1 according to a first modification. FIGS. 3B and 3C are each a side view illustrating the same. FIG. 3D is a plan view illustrating the same.

As illustrated in FIG. 3B, the top plates 11A, 11B, and 11C, which are in a region facing the opening S, of the top plate 11 are supported on the floor surface 13B by legs 15, which are movable between an upright position and a folded position.

As illustrated in FIG. 3C, the top plates 11D, 11E, and 11F, which are in a region not facing the opening S, of the top plate 11 are supported by grooves 17 formed so as to project on the inner surface side of the front wall surface 13C and the back wall surface 13F. In addition, all the top plates 11 may be slid, rather than being rotated, to be fitted in the grooves 17 by forming the grooves 17 over the entire length, in the width direction, of the front wall surface 13C and the back wall surface 13F by providing an opening S and a door 14 (not illustrated) that allow the user to enter and exit in the left wall surface 13D or the right side surface 13E.

Modification 2

Figure 4A:
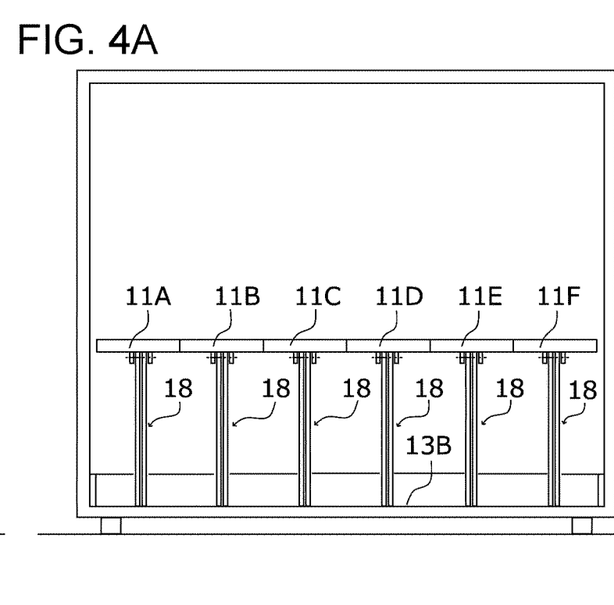
FIG. 4A is a front view illustrating the arrangement of top plates of a desk in the booth according to a second modification.
Figure 4B:
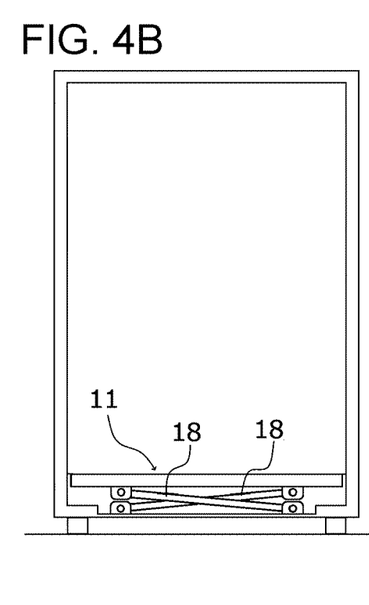
FIGS. 4B and 4C are each a side view illustrating the same.
Figure 4C:
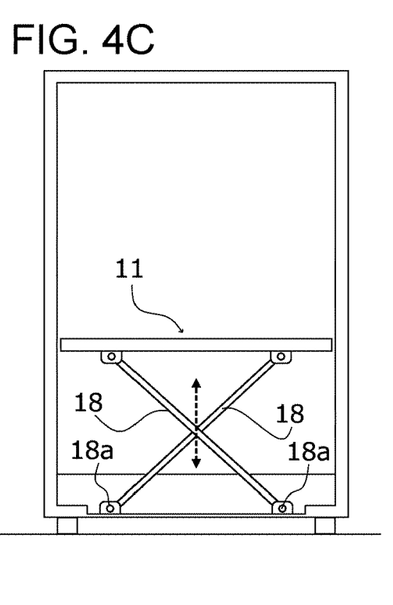
Figure 4D:
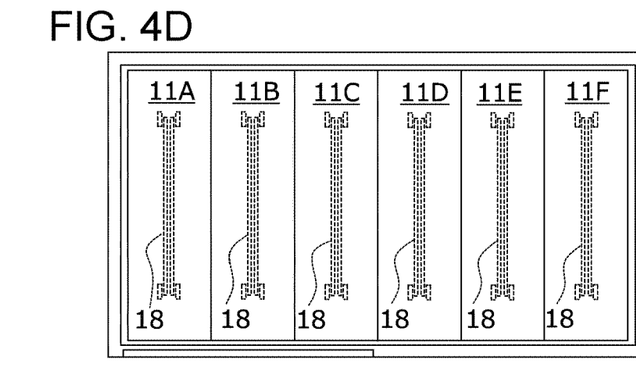
FIG. 4D is a plan view illustrating the same.

FIG. 4A is a front view illustrating the arrangement of top plates of a desk in the booth 2 according to a second modification. FIGS. 4B and 4C are each a side view illustrating the same. FIG. 4D is a plan view illustrating the same.

As illustrated in FIG. 4B, the top plate 11 may be divided into a plurality of pieces to be stored on the floor surface 13B, and may be developed in the space as necessary to be used as the desk 11. Specifically, the top plates 11A, 11B, 11C, 11D, 11E, and 11F are supported by links 18 so as to be movable in the vertical direction (see the arrow in FIG. 4C), and may be used as the desk 11 by rotating the links 18 about rotation support points 18a from a folded state by lifting the top plates 11 from the floor surface 13B as illustrated in FIG. 4C.

The thus configured booth 1 may be assembled in a factory etc., loaded onto a bed of a truck etc. to be carried, and installed on an installation surface at a predetermined installation location. The installation location may be an inside corner portion of a building framework as an example of an external space where pedestrians and the user of the booth 1 are present in a mixed manner. The booth 1 is preferably installed in an inside corner portion of a concourse space, a communication passage, etc. formed between a subway station and a ground portion. The installation location is not limited to an inside corner portion of a building framework. The booth 1 may be disposed freely in an external space.

(2) Development of Desk (2.1) Development and Mode of Use of Desk

FIGS. 5 to 9 are each a perspective view schematically illustrating a development pattern and a mode of use of the top plates 11 in the space of the booth 1 with the legs 15 not illustrated.

In the booth 1 according to the present exemplary embodiment, the top plate 11 is divided into six pieces, which are developed in accordance with a mode of use to be used in various ways by not only a single person but also a plurality of persons, by way of example.

Figure 5:
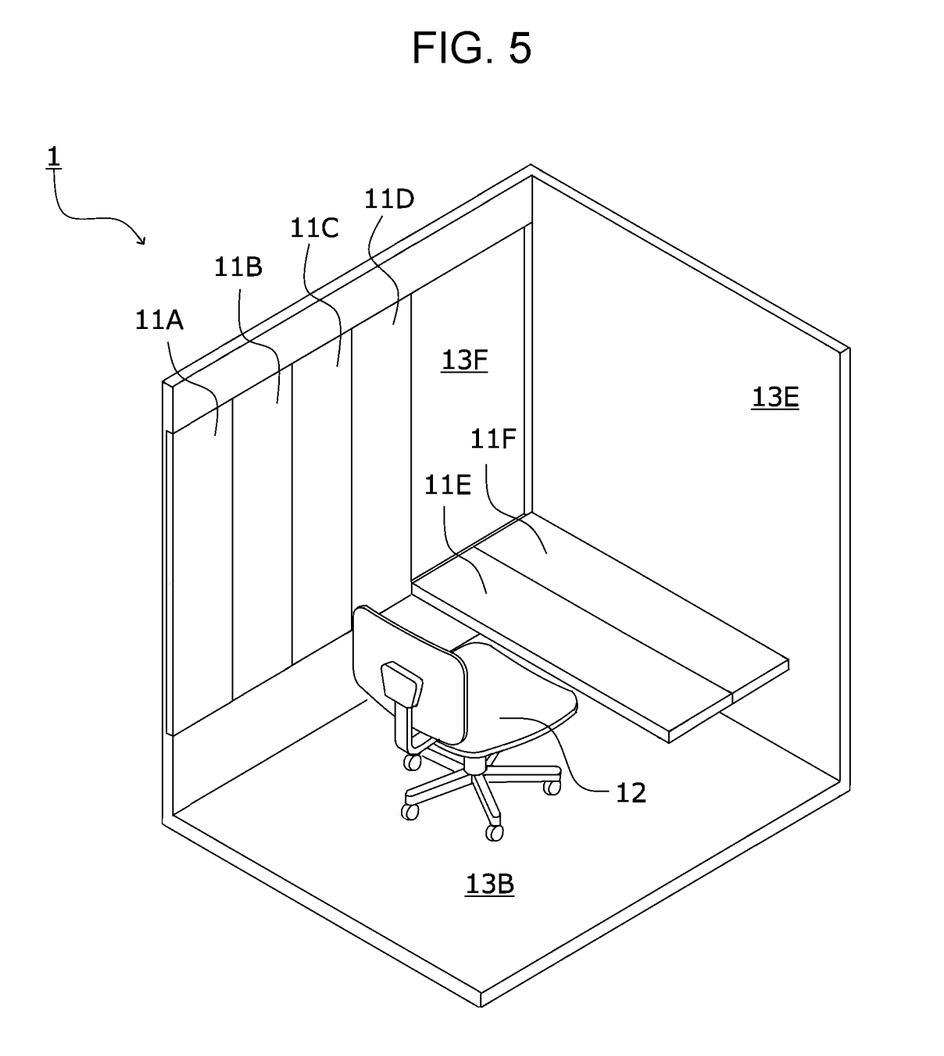
FIG. 5 is a perspective view schematically illustrating a first development pattern of the top plates in the space of the booth and the mode of use.

FIG. 5 illustrates an example in which the top plates 11E and 11F are developed so as to dispose a desk in contact with the right side surface 13E. If the depth of each of the top plates 11 is 250 mm to 300 mm, for example, a common desk with a depth of 500 mm to 600 mm is disposed in the space, which allows the user to work or study on the desk while being seated on the chair 12.

Figure 6:
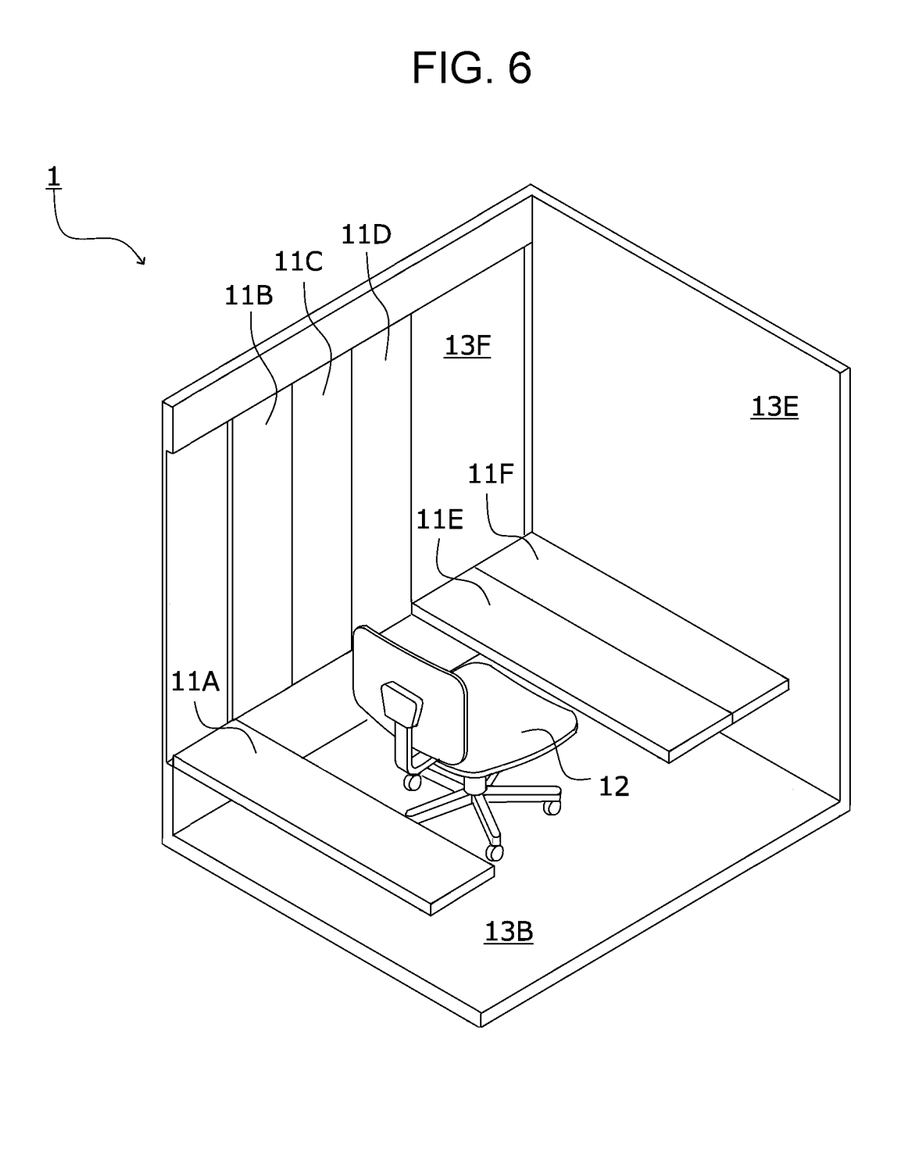
FIG. 6 is a perspective view schematically illustrating a second development pattern of the top plates in the space of the booth and the mode of use.

FIG. 6 illustrates an example in which the top plates 11E and 11F are developed so as to dispose a desk in contact with the right side surface 13E, and in which the top plate 11A is developed so as to dispose another desk in contact with the left wall surface 13D. The user is allowed to work or study on the desk while being seated on the chair 12 between the top plate 11E and the top plate 11A. The top plate 11A, which is at the back of the user, may be used as a place for placement of things etc.

Figure 7:
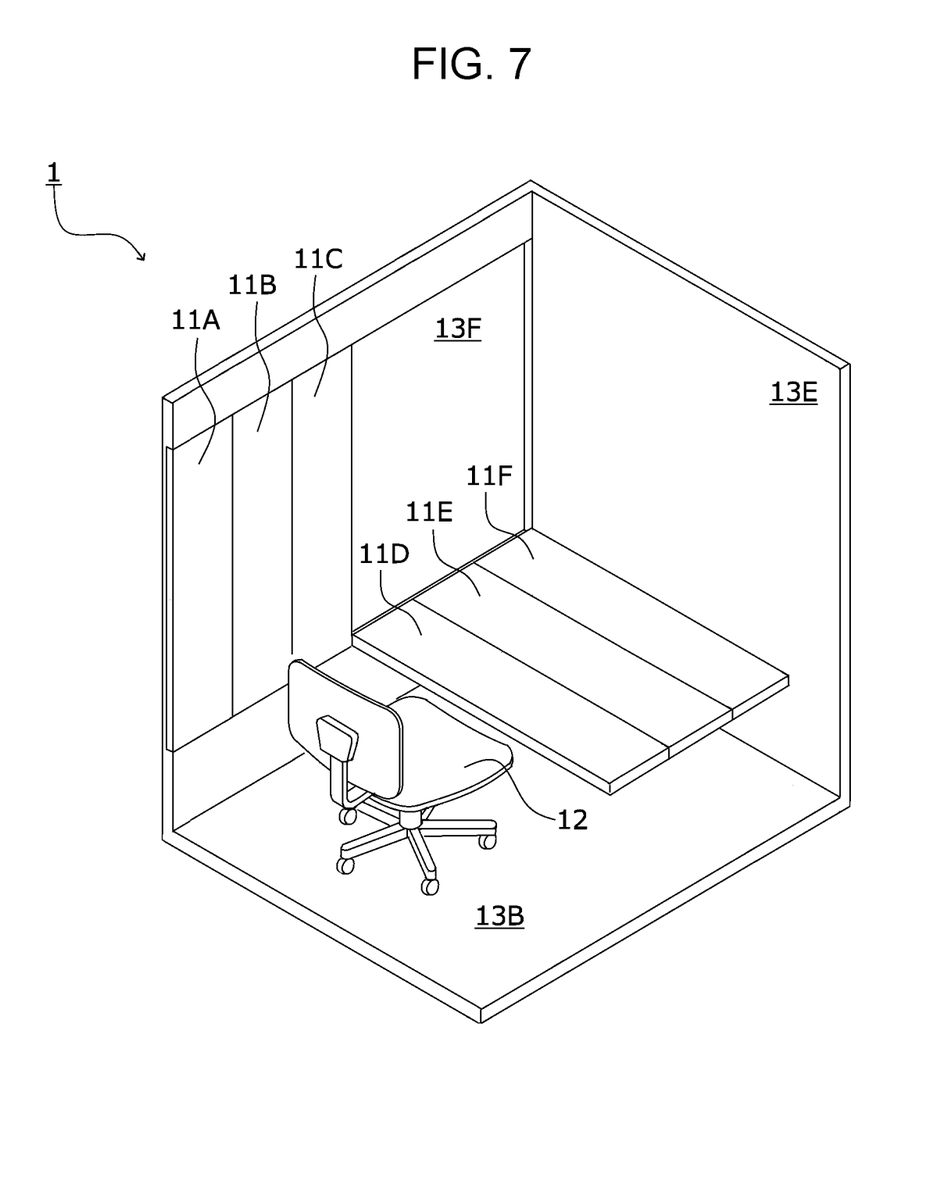
FIG. 7 is a perspective view schematically illustrating a third development pattern of the top plates in the space of the booth and the mode of use.

FIG. 7 illustrates an example in which the top plates 11D, 11E, and 11F are developed so as to dispose a desk in contact with the right side surface 13E. If the depth of each of the top plates 11 is 250 mm to 300 mm, for example, a desk with a large depth of 750 mm to 900 mm is disposed in the space, which allows the user to work or study using the large desk while being seated on the chair 12.

Figure 8:
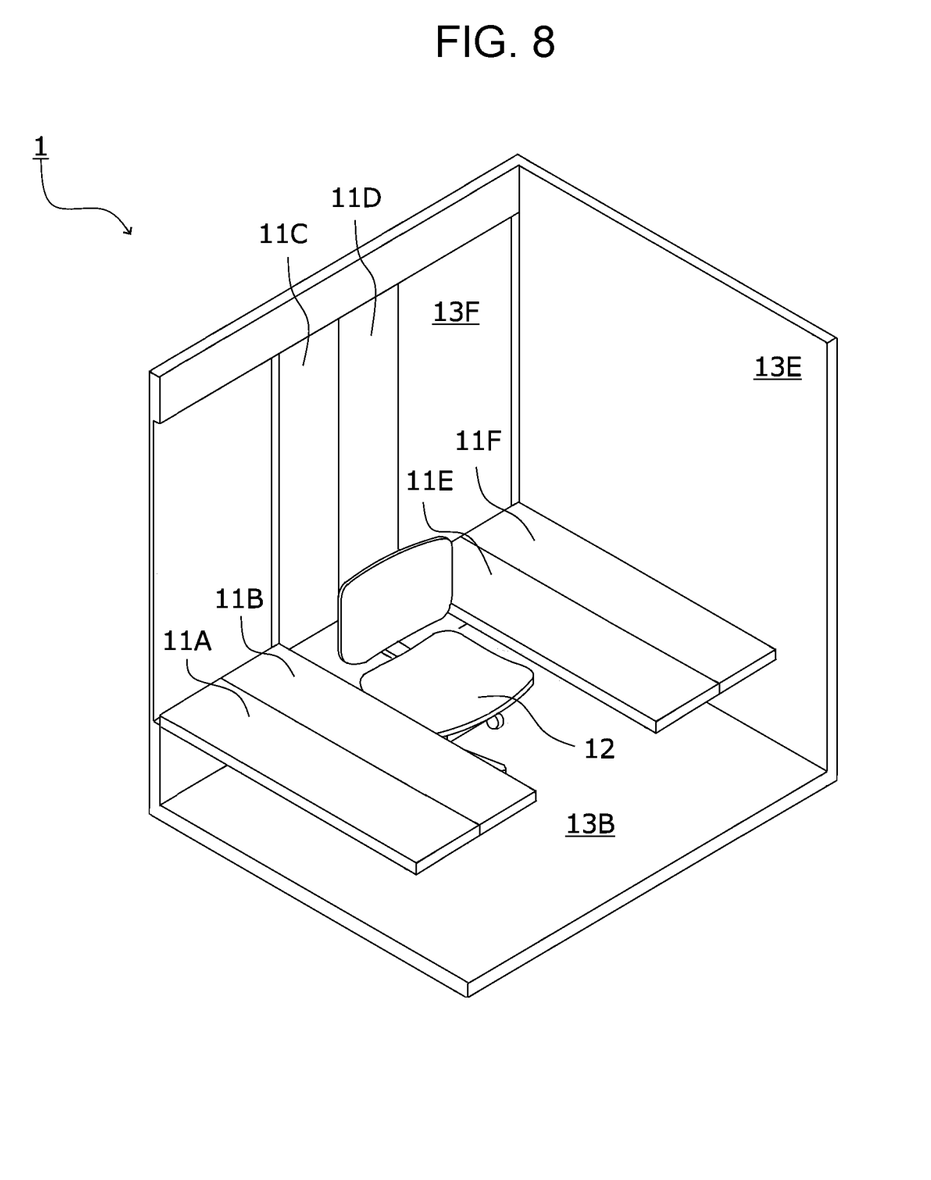
FIG. 8 is a perspective view schematically illustrating a fourth development pattern of the top plates in the space of the booth and the mode of use.

FIG. 8 illustrates an example in which the top plates 11E and 11F are developed so as to dispose a desk in contact with the right side surface 13E, and in which the top plates 11A and 11B are developed so as to dispose another desk in contact with the left wall surface 13D. The user is allowed to work or study using each of the desks as necessary while being seated on the chair 12 between the top plate 11E and the top plate 11B.

Figure 9:
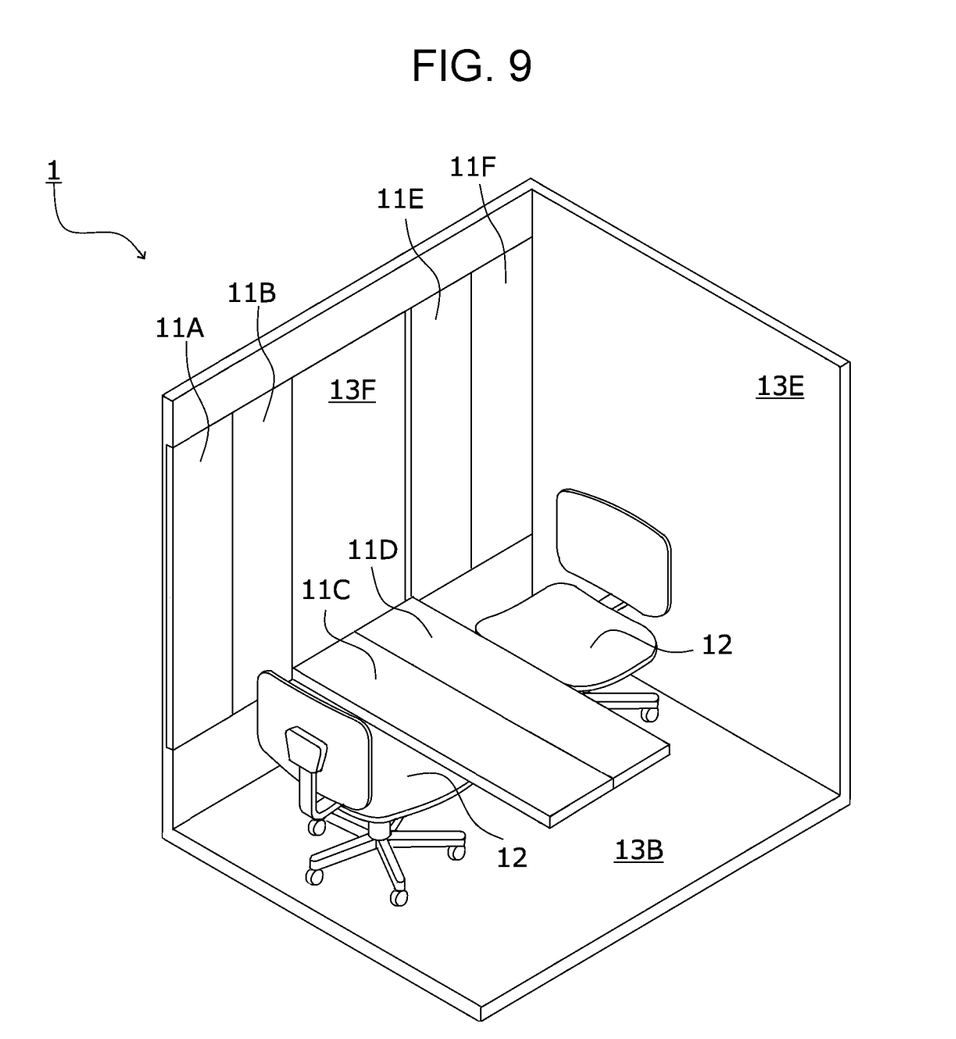
FIG. 9 is a perspective view schematically illustrating a fifth development pattern of the top plates in the space of the booth and the mode of use.

FIG. 9 illustrates an example in which the top plates 11C and 11D are developed so as to dispose a desk in the middle portion of the space. Two persons are allowed to have an interview etc. while facing each other over the desk, for example, by disposing the chair 12 on each side of the desk.

(2.2) Overlap of End Portions of Developed Desk

Figure 10A:
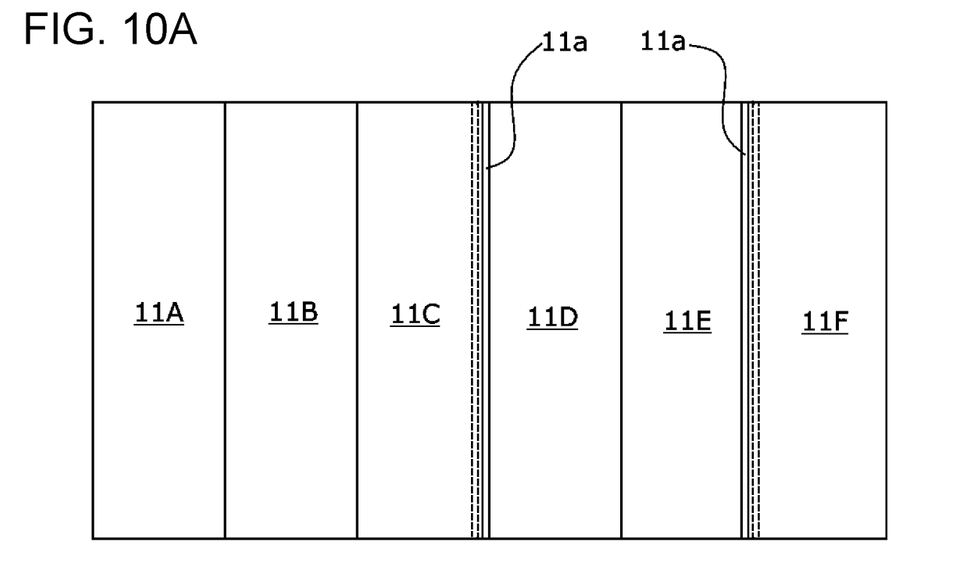
FIG. 10A is a plan view illustrating the overlap of developed top plates.
Figure 10B:
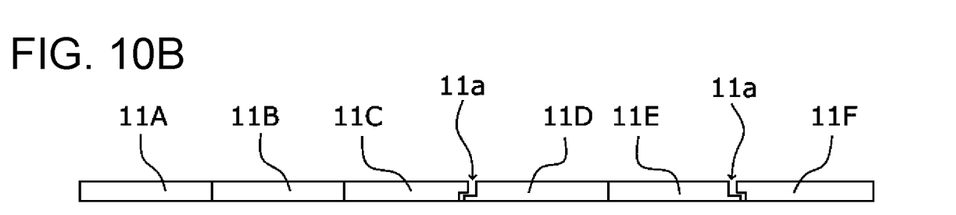
FIG. 10B is a sectional view illustrating the same.
Figure 10C:
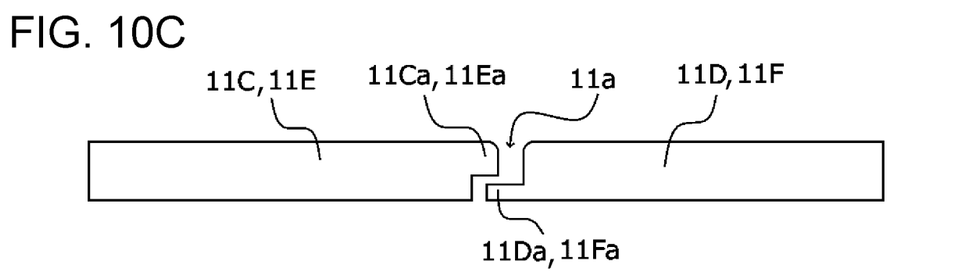
FIG. 10C is an enlarged sectional view of an overlapping portion of the developed top plates.
Figure 11A:
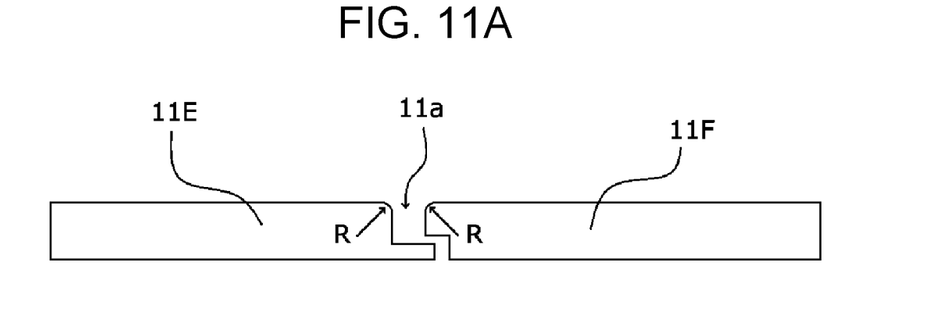
FIG. 11A is an enlarged sectional view of an overlapping portion of the developed top plates.
Figure 11B:
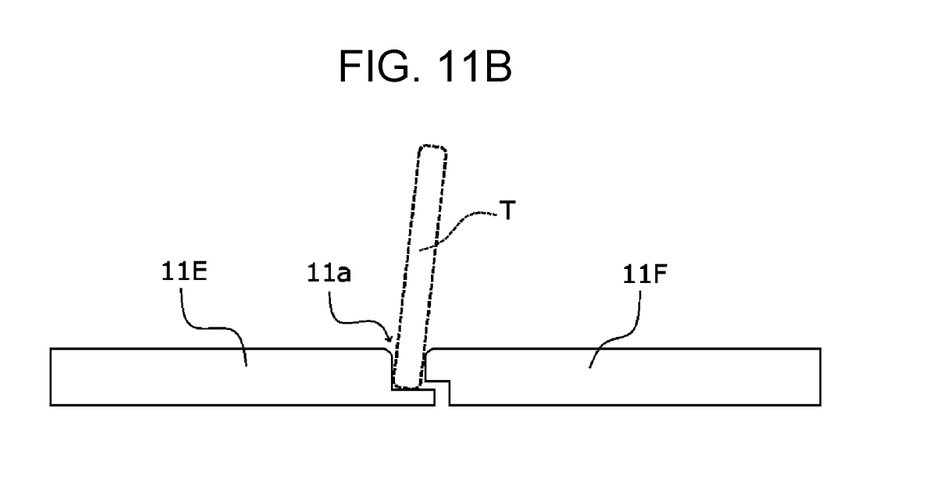
FIG. 11B is an enlarged sectional view of the overlapping portion of the top plates with one end portion of a device inserted into a groove portion.

FIG. 10A is a plan view illustrating the overlap of developed top plates. FIG. 10B is a sectional view illustrating the same. FIG. 10C is an enlarged sectional view of an overlapping portion of the developed top plates. FIG. 11A is an enlarged sectional view of an overlapping portion of the developed top plates. FIG. 11B is an enlarged sectional view of the overlapping portion of the top plates with one end portion of a device inserted into a groove portion.

As illustrated in FIGS. 10A to 10C, the developed top plates 11 are configured such that the end portions of sides of adjacent top plates intersecting the rotational direction overlap each other so that the upper surfaces of the developed top plates 11 are maintained in a planar state and a groove portion 11a that enables insertion of one end portion of a device that is used by the user of the booth 1 is formed.

Specifically, as illustrated in FIG. 10C, an end portion 11Ca and an end portion 11Da of adjacent sides of the top plate 11C and the top plate 11D overlap each other in the thickness direction, for example, so that the upper surfaces of the top plates 11C and 11D are planar and a groove portion 11a is formed. In addition, an end portion 11Ea and an end portion 11Fa of adjacent sides of the top plate 11E and the top plate 11F overlap each other in the thickness direction so that the upper surfaces of the top plates 11E and 11F are planar and a groove portion 11a is formed.

When a plurality of pieces obtained by dividing the top plate 11 are developed in accordance with the usage, it is considered that the layout illustrated in FIG. 5, in which the top plates 11E and 11F are developed so as to dispose a desk in contact with the right side surface 13E, the layout illustrated in FIG. 6, in which the top plates 11E and 11F are developed so as to dispose a desk in contact with the right side surface 13E and in which the top plate 11A is developed so as to dispose another desk in contact with the left wall surface 13D, and the layout illustrated in FIG. 9, in which the top plates 11C and 11D are developed so as to dispose a desk in the middle portion of the space, are more frequently used. Therefore, the end portions of adjacent sides of the top plate 11C and the top plate 11D, and the top plate 11E and the top plate 11F are caused to overlap each other in the thickness direction, as illustrated in FIG. 10C, so that one of the overlapping end portions is not exposed to an edge of the developed desk that contacts the user.

As illustrated in FIG. 11A, the end portions of the top plates 11 to form the groove portion 11a are chamfered to have round corner portions.

Figure 12A:
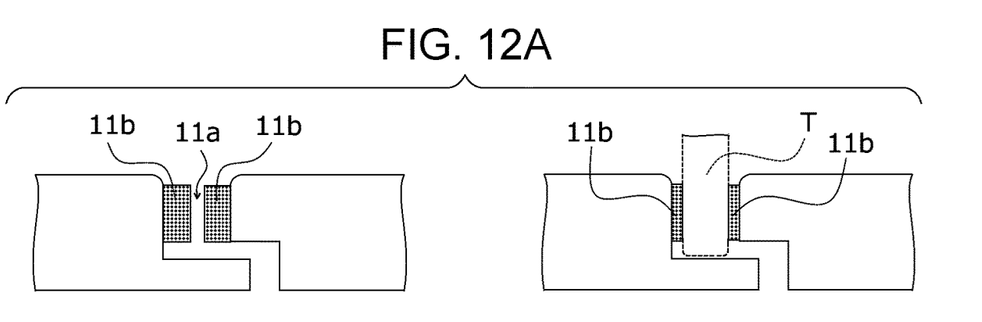
FIG. 12A is an enlarged schematic sectional view illustrating insertion of a device into a groove portion blocked by elastic members.
Figure 12B:
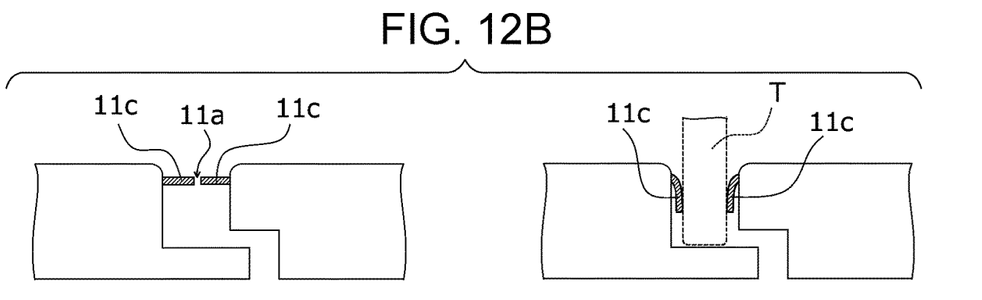
FIG. 12B is an enlarged schematic sectional view illustrating insertion of a device into a groove portion blocked by flexible members.
Figure 12C:
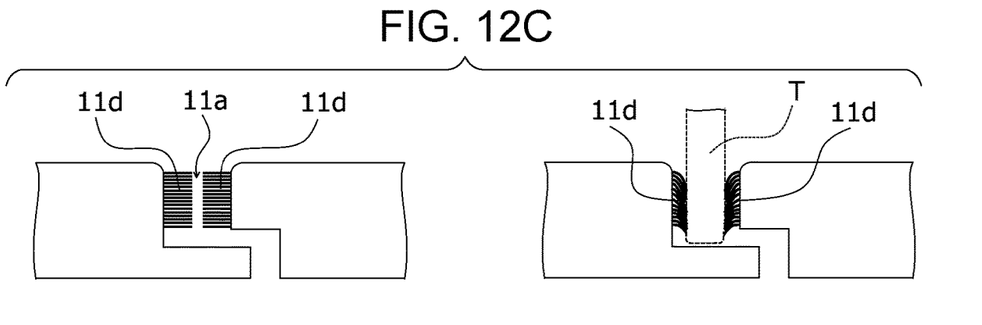
FIG. 12C is an enlarged schematic sectional view illustrating insertion of a device into a groove portion blocked by brushes.
Figure 12D:
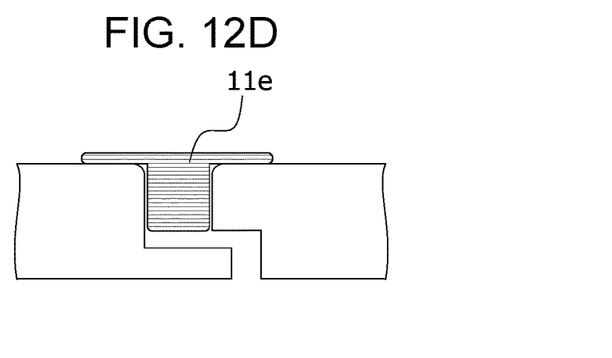
FIG. 12D is an enlarged sectional view illustrating a groove portion blocked by a lid.

FIG. 12A is an enlarged schematic sectional view illustrating insertion of a device into the groove portion 11a blocked by elastic members. FIG. 12B is an enlarged schematic sectional view illustrating insertion of a device into the groove portion 11a blocked by flexible members. FIG. 12C is an enlarged schematic sectional view illustrating insertion of a device into the groove portion 11a blocked by brushes 11d. FIG. 12D is an enlarged sectional view illustrating the groove portion 11a blocked by a lid 11e.

The groove portion 11a is preferably blocked by elastic members 11b as illustrated in FIG. 12A. The elastic members 11b may be foamed rubber sponges.

The groove portion 11a may be blocked by flexible members 11c as illustrated in FIG. 12B. The flexible members 11c may be rubber sheets.

The groove portion 11a may be blocked by brushes 11d as illustrated in FIG. 12C. The material of the brushes 11d may be a fibrous synthetic material, a resin, a plant, and animal hair, by way of example.

In the case where an object such as a device is not placed in the groove 11a which is formed at the overlapping portion of the developed top plates 11, the groove portion 11a may be blocked by a lid 11e as illustrated in FIG. 12D.

(2.3) Layout of Desk

Figure 13:
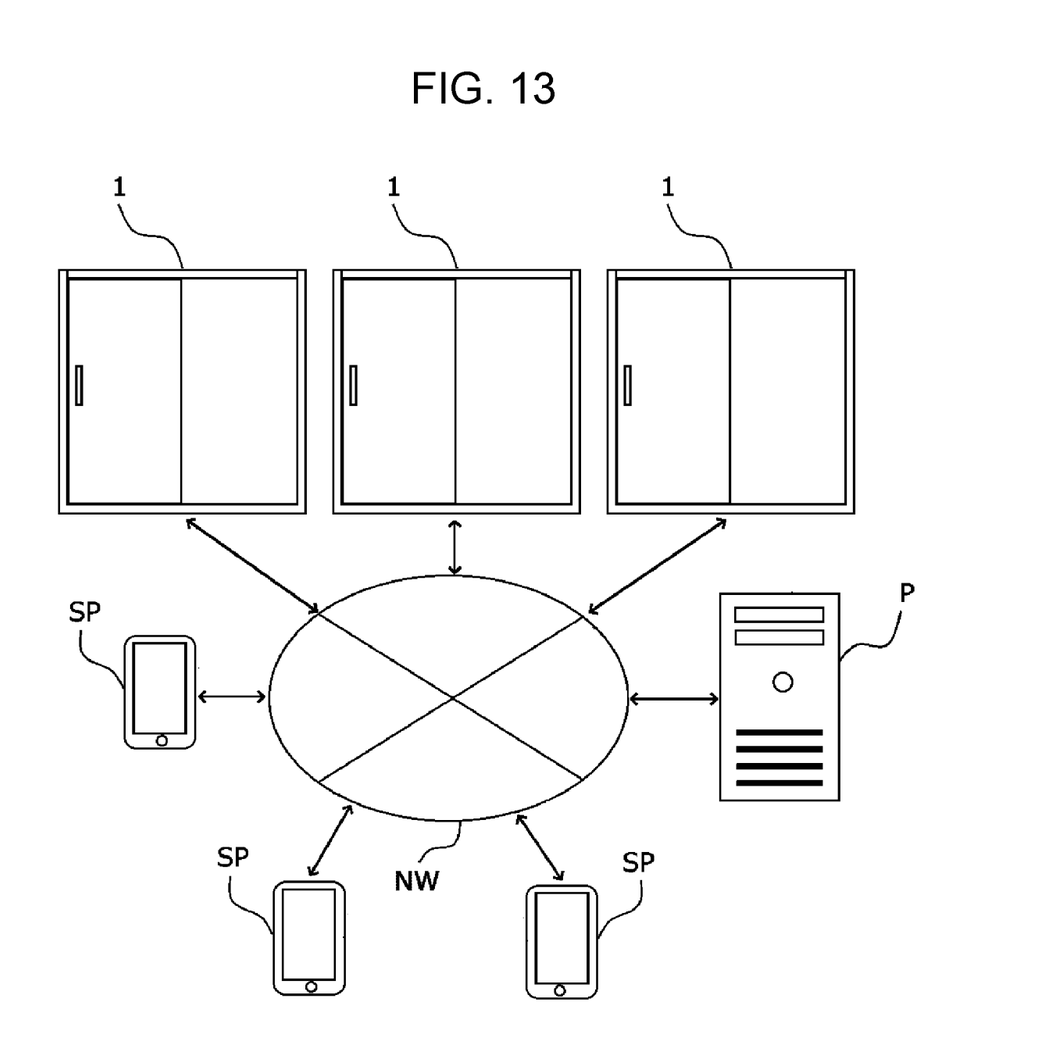
FIG. 13 schematically illustrates an example of an overall configuration of a reservation system for the booth.

FIG. 13 schematically illustrates an example of an overall configuration of a reservation system for the booth 1.

In the present exemplary embodiment, the top plates 11 may be rotated in the space to be developed by either the user of the booth 1 operating a reserver terminal SP that is used to reserve the booth 1 or operating an operation portion (not illustrated) disposed in the booth 1.

The top plates 11 in the booth 1 are developed using an electronic key which is constituted of an unlocking key signal. The electronic key is stored in the reserver terminal SP of a portable type. The reserver terminal SP of a portable type is assumed to be a smartphone. However, the reserver terminal SP of a portable type may be a so-called wearable terminal or bearable terminal, or may be a game terminal that has a communication function with the Internet.

When the reserver terminal SP is used as an electronic key, the electronic key is transmitted from a reservation management server P to the reserver terminal SP after a reservation is determined. The user may unlock and develop the top plates 11 by operating the reserver terminal SP which has received the electronic key. Alternatively, the top plates 11 may be unlocked and developed using an electronic key stored in the reserver terminal SP by reading a two-dimensional code pattern displayed in the booth 1.

The user may develop the top plates 11 into a development layout specified in advance, by specifying the development layout of the top plates 11 when reserving the booth 1 and operating the reserver terminal SP when using the booth 1. Examples of the development layout include the arrangements of the desk illustrated in FIGS. 5 to 9.

To specify the development layout of the top plates 11, the user may input the purpose of use, when reserving the booth 1, to allow the reserver terminal SP to display a development layout of the top plates 11 that matches the purpose of use, and select the development layout via the reserver terminal SP.

When the user reserves the booth 1, the development layout and the development procedures of the top plates 11 are displayed on the reserver terminal SP in accordance with the purpose of use. The user may also unlock the top plates 11 by operating the reserver terminal SP when using the booth 1, and develop the top plates 11 into a development layout specified in advance by rotating the top plates 11 in accordance with the displayed procedures.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A booth comprising:
a space bounded by a floor and a side wall,
an opening that allows a user to enter and exit the space,
a top plate of a desk is installed in the space, wherein
a deployment area or a deployment position of the top plate is changeable in the space,
the booth is made usable by making a reservation, and
end portions of sides of adjacent top plates intersecting a rotational direction overlap each other, and a groove portion that enables insertion of one end portion of a device that is used by the user is formed in upper surfaces of the top plates in a deployed state.

2. The booth according to claim 1,
wherein the top plate is divided into a plurality of plates, and configured to be rotated in the space to be deployed from a state in which the top plate is stored on an inner surface of the side wall or the floor so that the top plate is supported on the floor by a leg that is movable between an upright position and a folded position.

3. The booth according to claim 2,
wherein the leg is on the top plate and rotatable.

4. The booth according to claim 2,
wherein the leg is on the floor and foldable.

5. The booth according to claim 1,
wherein the top plate is divided into a plurality of pieces, and configured to be deployed in the space from a state in which the top plate is stored on an inner surface of the side wall or the floor to be supported by another side wall that faces the side wall.

6. The booth according to claim 1,
wherein upper surfaces of the top plates in a deployed state are maintained in a planar shape.

7. The booth according to claim 2,
wherein upper surfaces of the top plates in a deployed state are maintained in a planar shape.

8. The booth according to claim 3,
wherein upper surfaces of the top plates in a deployed state are maintained in a planar shape.

9. The booth according to claim 1,
wherein the end portions have chamfered corner portions.

10. The booth according to claim 1,
wherein the groove portion is blocked by a flexible member at the end portions.

11. The booth according to claim 1,
wherein the groove portion is blocked by an elastic member at the end portions.

12. The booth according to claim 1,
wherein the groove portion is blocked by a brush at the end portions.

13. The booth according to claim 1,
wherein the groove portion is blocked by a lid body.

14. The booth according to claim 1,
wherein the top plate is configured to be rotated in the space to be deployed by either the user operating a terminal that is used to reserve use of the booth in advance or operating an operation portion in the booth.

15. The booth according to claim 1,
wherein the top plate is configured to be rotated in the space to be deployed in accordance with a reserver by specifying a mode of deployment of the top plate when reserving the booth.

16. The booth according to claim 1,
wherein a mode of deployment of the top plate is displayed in accordance with a purpose of use input when reserving the booth to enable selecting the mode of deployment of the top plate.

17. The booth according to claim 1,
wherein a mode of deployment of the top plate and deployment procedures are displayed in accordance with a purpose of use input when reserving the booth to enable selecting the mode of deployment of the top plate.

18. The booth according to claim 1,
wherein the top plate is configured to be made usable by selectively inserting a plurality of top plates into a recessed portion in an inner surface of the side wall.

19. The booth according to claim 1, comprising:
a chair including a foldable seat surface configured to be stored on the side wall, wherein the seat surface is configured to be rotated to be deployed to enable the user to be seated thereon.

* * * * *